US005602537A

United States Patent [19]
Dalrymple

[11] Patent Number: 5,602,537
[45] Date of Patent: Feb. 11, 1997

[54] TECHNIQUE FOR ELIMINATING DATA TRANSMIT MEMORY UNDERRUNS

[75] Inventor: Monte J. Dalrymple, Fremont, Calif.

[73] Assignee: Zilog, Inc., Campbell, Calif.

[21] Appl. No.: 626,163

[22] Filed: Mar. 29, 1996

Related U.S. Application Data

[63] Continuation of Ser. No. 242,251, May 13, 1994, abandoned.

[51] Int. Cl.$^6$ .................................................. G06F 13/38
[52] U.S. Cl. ................... 340/825.06; 340/825.15; 340/825.57; 395/250
[58] Field of Search .............. 340/825.15, 825.06, 340/825.57, 825.62, 825.65, 825.68; 364/900, 933.6, 947.2, 957.6, 965.4; 370/77, 85.2, 85.1, 85.6, 32, 58.1, 60, 61, 94.1, 94.2, 99; 395/250, 275; 341/101

[56] References Cited

U.S. PATENT DOCUMENTS

| | | | |
|---|---|---|---|
| 4,127,845 | 11/1978 | Dansbach et al. | 340/825.06 |
| 4,433,391 | 2/1984 | Potash | 340/825.65 |
| 4,885,584 | 12/1989 | Dalrymple | 341/101 |
| 4,907,225 | 3/1990 | Gulick et al. | 370/94.1 |
| 4,942,553 | 7/1990 | Dalrymple et al. | 395/250 |
| 4,989,135 | 1/1991 | Miki | 364/200 |
| 5,175,818 | 12/1992 | Kunimoto et al. | 370/60 |
| 5,179,661 | 1/1993 | Copeland, III et al. | 395/250 |
| 5,210,749 | 5/1993 | Firoozmand | 370/94.1 |
| 5,278,956 | 1/1994 | Thomsen et al. | 395/250 |
| 5,361,335 | 11/1994 | Oyadomari | 395/250 |
| 5,384,770 | 1/1995 | Mays et al. | 370/61 |
| 5,406,554 | 4/1995 | Parry | 370/58.1 |
| 5,412,782 | 5/1995 | Hausman et al. | 395/250 |
| 5,426,639 | 6/1995 | Follett et al. | 370/94.1 |
| 5,426,756 | 6/1995 | Shyi et al. | 395/425 |

*Primary Examiner*—Michael Horabik
*Assistant Examiner*—William H. Wilson, Jr.
*Attorney, Agent, or Firm*—Majestic, Parsons, Siebert & Hsue

[57] ABSTRACT

In a system for transmitting data employing a transmit FIFO and a transmitter, the quantity of data that has been written into the FIFO is monitored and a transmitter is caused to begin transmitting data from the memory when the quantity of data in the memory exceeds a predetermined level. An end of frame condition is detected and a transmitter is caused to begin transmitting data upon receipt of end of frame signal even though the quantity of data in the memory does not exceed the predetermined level.

15 Claims, 3 Drawing Sheets

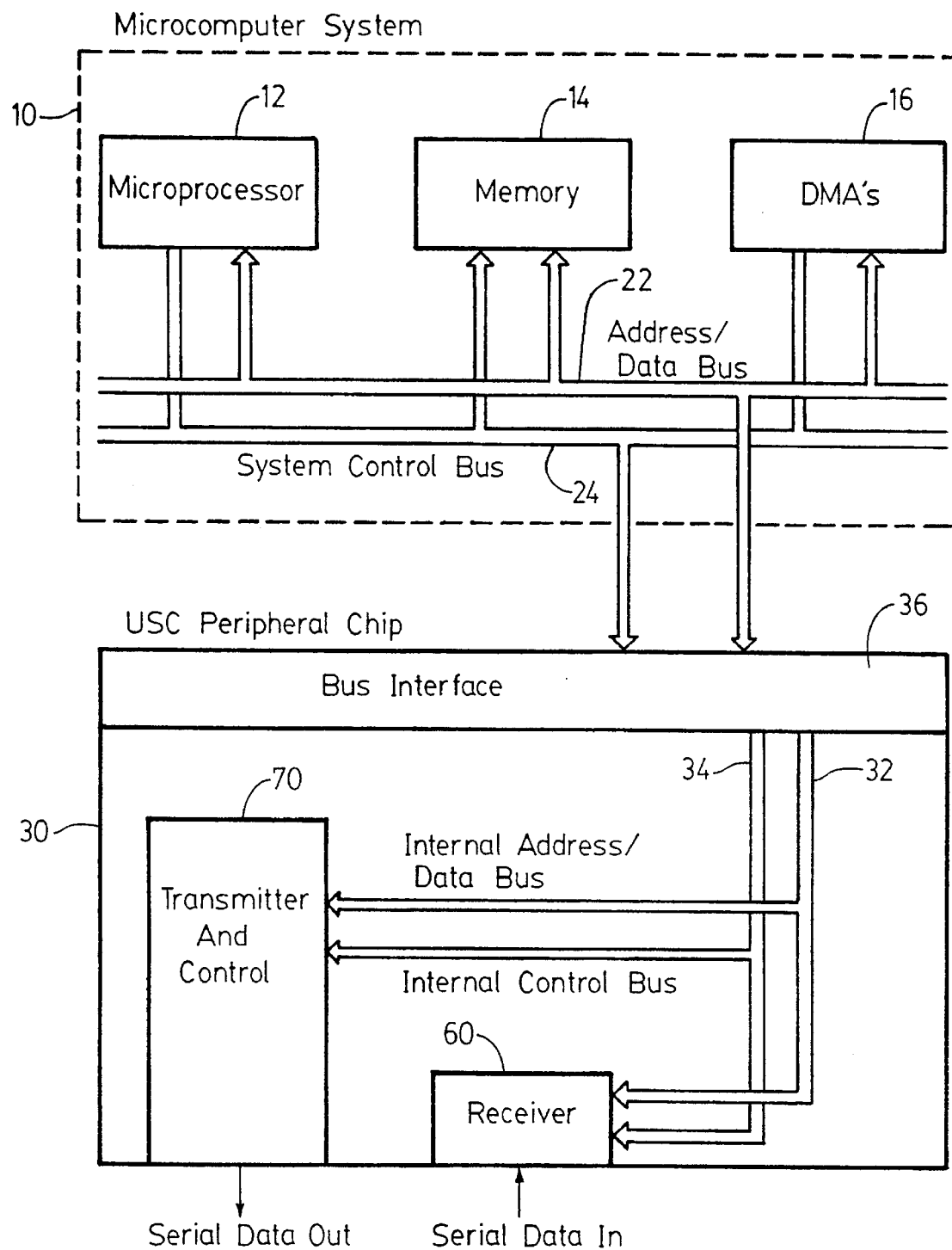
FIG._1.

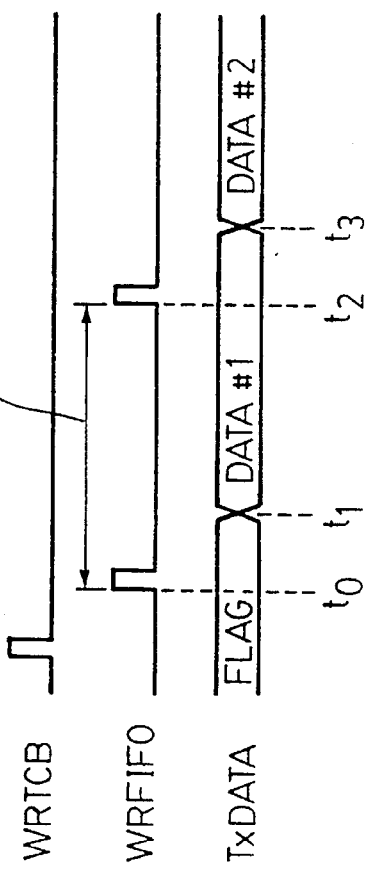
FIG._2.
PRIOR ART
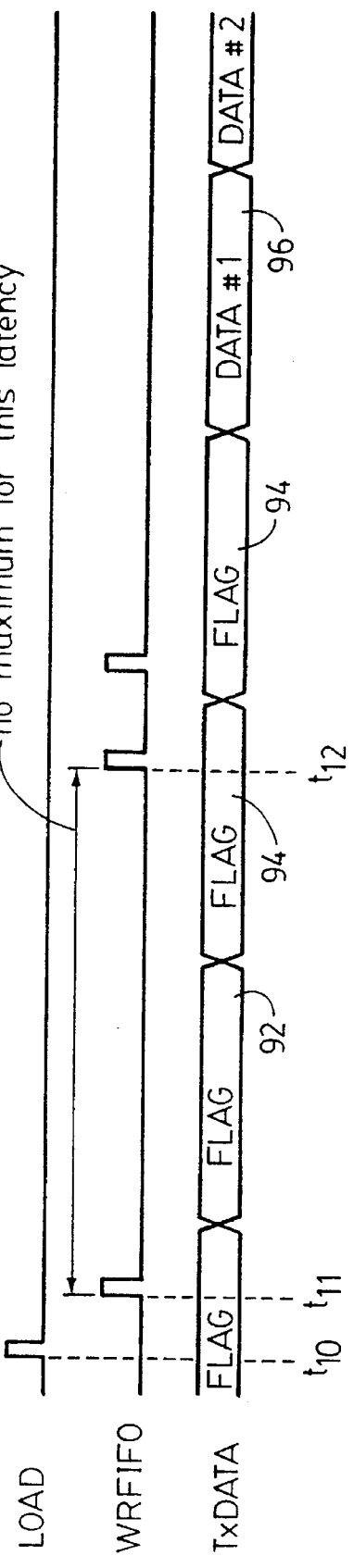
FIG._4.

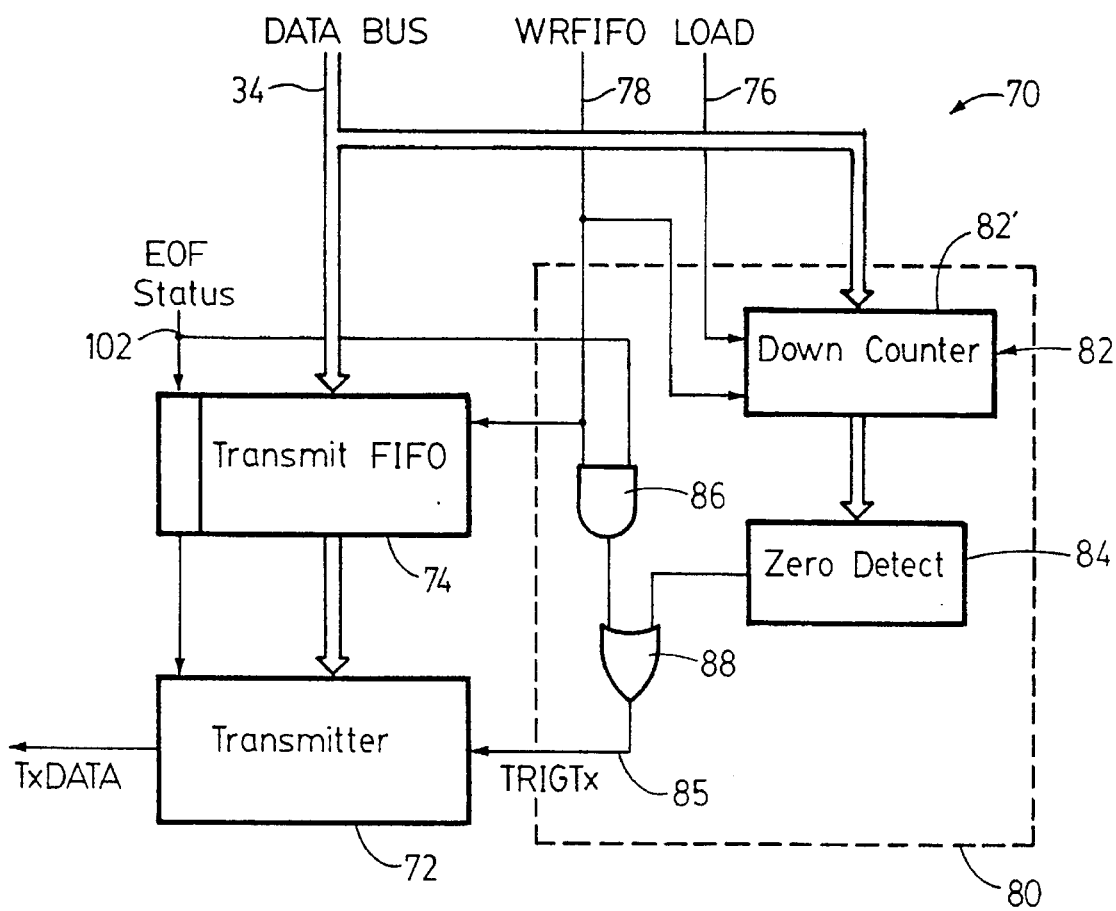
EOF: End of Frame
WRFIFO: Write Tx FIFO
WRTCB: Write Tx Control Block
TRIGTX: Trigger Transmitter signal starts frame transmission
FIG._3.

TECHNIQUE FOR ELIMINATING DATA TRANSMIT MEMORY UNDERRUNS

This is a continuation of application Ser. No. 08/242,251, filed May 13, 1994, now abandoned.

BACKGROUND OF THE INVENTION

This invention relates to a technique for eliminating transmit memory underruns, particularly upon start-up.

In computer systems, it is common to employ a transmit memory such as a transmit first-in-first-out memory (FIFO) for storing data to be transmitted. In most designs, the transmitter would start the transmission of data from the transmitter FIFO after one byte of data has been written into the FIFO. If another byte of data is not written into the transmit FIFO during the time required for the first byte of data to be transmitted by the transmitter, the transmitter will underrun and the frame sent will be corrupted, so that the frame needs to be re-sent. The failure to write a second byte after the first is written can be caused, for example, by the fact that control of the data bus may be preempted by another function in the computer system, such as by the receipt of data originating from a remote location. The problem is particularly acute at high data rates where the instantaneous response time of the microprocessor or direct memory access controller (DMA) is longer than the time it takes to transmit one byte of data. Normally the FIFO allows for this because the peak data transfer rate into the FIFO is much higher than the rate at which the transmitter transmits data. However, when the FIFO is not at least partially filled as in a start-up situation, the microprocessor may receive an interrupt (such as when data is received) or the DMA may lose control of the data bus, after a first byte of data is written into an otherwise empty FIFO. In such events, where the instantaneous response time of the microprocessor or DMA is longer than the time it takes to transmit one byte of data, the transmitter is likely to underrun. It is therefore desirable to provide a system for transmitting data which is not subject to the above-described problems.

SUMMARY OF THE INVENTION

This invention is based on the observation that, by delaying the triggering of the transmission by the transmitter until the quantity of data stored in the transmit memory exceeds a predetermined level, it is possible to avoid the above-described problem of transmitter underruns.

One aspect of the invention is directed towards an apparatus for transmitting data comprising a memory for storing data, a transmitter transmitting data from the memory, and a monitoring device causing the transmitter to begin transmitting data from the memory when quantity of data in the memory exceeds a predetermined level.

Another aspect of the invention is directed towards a method for transmitting data, employing a memory for storing data, and a transmitter transmitting data from the memory. The method comprises monitoring quantity of data in the memory and causing the transmitter to begin transmitting data from the memory when the quantity of data in the memory exceeds a predetermined level.

BRIEF DESCRIPTION OF THE DRAWINGS

FIG. 1 is a block diagram of a microprocessor system and a peripheral chip useful for illustrating the present invention.

FIG. 2 is a timing diagram illustrating a conventional scheme for transmitting data stored in the transmit memory.

FIG. 3 is a schematic circuit diagram of a transmitter and transmitter control to illustrate the preferred embodiment of the present invention.

FIG. 4 is a timing diagram illustrating the operation of the transmit control function of FIG. 3.

DETAILED DESCRIPTION OF THE PREFERRED EMBODIMENT

The various aspects of the present invention are described herein by reference to a Universal Serial Controller (USC) integrated circuit chip of Zilog, Inc., Campbell, Calif., assignee of the present application. The digital communication environment for the invention will first be described in reference to FIG. 1. Referring to FIG. 1, the system in which the USC chip is used is shown in schematic block diagram form. The microcomputer system 10 comprises a microprocessor 12, a memory 14 and DMA's (direct memory access controllers) 16 are interconnected by the system address/data bus 22 and the system control bus 24. These two buses are also connected to the USC peripheral chip 30 through device bus interface 36 to communicate with the internal address/data bus 32 and control bus 34 of chip 30. The USC chip 30 comprises a receiver 60 and a transmitter and control 70, each represented as a functional block interconnected by internal buses 32 and 34. The preferred embodiment of the invention is explained below in reference to a more detailed schematic diagram of block 70 in FIG. 3.

The USC chip serves to convert between parallel data and serial data. In the receive case, the serial data enters the USC chip 30 through the receiver 60 and eventually gets converted to parallel form. The parallel data is then read from the USC chip and written into the system memory 14 of the microcomputer system 10 via internal address/data bus 32, device bus interface 36 and system address/data bus 22. In the transmit case, parallel data in the system memory 14 of the microcomputer system 10 is written to the USC peripheral chip via system address/data bus 22. The parallel data finds its way to the transmitter 70 by way of internal address/data bus 32 and gets serialized and emerges as serial data.

Typically, read or write operations on any addressable register or memory are done by normal bus access under the control of the microprocessor. In order to perform a read or write cycle, the microprocessor's address and data registers are loaded with the new values. The microprocessor first puts out the address of the memory or register on the address bus; the address is decoded to enable the addressed register or memory for read or write. The microprocessor then makes available the data on the data bus and issues a strobe signal to latch the data from the bus onto the register or memory. These operations demand the full attention of the microprocessor to the exclusion of any other operation. Furthermore, if the microprocessor is engaged in the middle of another operation when called upon to perform a read or write cycle, it must first store away the current contents of the address and data registers as well as the program counter before loading in the new ones. In this way, the existing contents may be restored after the cycle has been completed. This obviously takes time and compromises performance.

In the case where there is a whole block of data to be transferred, it is more efficient to use a DMA to control the transfer instead of the microprocessor. In this case, the peripheral needing a block of data to be transferred issues a request to the DMA. The DMA then requests the control of the bus from the microprocessor, and after obtaining it, issues an acknowledgment to the peripheral to initiate the data transfer under its control. Due to the overhead incurred, this mode of transfer is only efficient when a block of data is transferred at a time. The above serves as a useful background for discussion of the invention.

The problems encountered in the conventional transmit scheme resulting in transmitter underruns will now be described by reference to FIG. 2. The overall microprocessor system setup for the conventional transmitter scheme of FIG. 2 is similar to that in FIG. 1 for illustrating the invention, except for the construction of the transmitter and control block 70. FIG. 2 is a timing diagram illustrating the operation of one conventional data transmit system. Before the transmit operation is initiated, the microprocessor writes the length of the frame in a designated register (not shown). Such value is used to set a down counter (not shown). When the counter counts to 1, it then causes an end of frame status bit to be set to indicate the end of the frame. A write enable signal WRFIFO is generated either by the microprocessor or the DMA to cause a byte of data to be written into a transmit FIFO in the transmitter of the peripheral chip. As known to those skilled in the art, prior to any data having been written into the transmit FIFO, the transmitter simply transmits flag signals to indicate that it is in the idle state and that no data is transmitted. Such flag signals would indicate to the receiver the present idle state of the transmitter.

The write enable signal WRFIFO occurring at time t0 in FIG. 2 will enable a byte of data, such as 8 bits of data, to be written into the transmit FIFO. In a conventional scheme, the transmitter is then triggered automatically by the writing of data into the transmit FIFO to transmit the first byte of data stored into the FIFO. The transmitter is operated by a transmit clock in order to transmit serially the 8 bits in the first byte written into the FIFO. At a predetermined delay (predetermined in accordance with the design of the transmitter FIFO and of the transmitter) after t0, the transmitter starts transmitting the 8 bits of data in the first byte at time t1. As operated by the transmitter clock, it will take eight transmit clock cycles for the 8 bits of data to be transmitted serially by the transmitter, so that the transmission of the first byte will end at time t3. For the purpose of discussion, it is assumed that a second byte of data has been written into the transmit FIFO as enabled by a second write enable signal at time t2. If time t2 precedes time t3 by at least the time delay predetermined by the design of the FIFO and transmitter, that is the time period between t0 and t1, then the second byte of data has been written into the transmit FIFO in time for the second byte of data to be transmitted beginning at time t3 as shown in FIG. 2. If the write enable signal for writing a second byte of data into the transmit FIFO still has not occurred at time t2, then at time t3, the transmitter will find no data to transmit and will transmit a flag signal instead. According to commonly used transmission protocol, frames that are too short are disregarded. The transmission of the frame is therefore compromised, which is undesirable.

It will be noted from the above discussion that, in order for frame transmission not to be compromised in the conventional transmit scheme, the time period t0–t2 must be equal to or less than the time period t1–t3, or the time required for the transmitter to transmit the first byte of data. Where the byte includes 8 bits transmitted serially, the time period t0–t2 cannot be less than eight transmit clock cycles. As known to those skilled in the art, the process of the DMA writing the next byte or next few bytes of a frame of data into the transmit FIFO upon start-up may be interrupted, such as when the control of data bus is preempted by the receiver to receive data sent to the peripheral chip 30 from an external data source. When such interruption occurs, the performance of the transmission operation is compromised. The above described problem is particularly acute upon start-up of the transmission process when few bytes have been written into the transmitter FIFO.

This invention is based on the observation that by delaying the initiation of data transmission by the transmitter until a predetermined number of bytes of data has been written into the transmit FIFO, instead of at the end of a short time period t0–t2 or t1–t3, the above-described problem can be avoided. FIG. 3 is a schematic circuit diagram illustrating in detail the transmitter and control block 70 of FIG. 1 to illustrate the preferred embodiment of the invention.

As shown in FIG. 3, the transmitter and control block 70 includes a transmitter 72, a transmit FIFO 74, and control circuit 80. The internal control bus 34 of FIG. 1 includes lines 76, 78, 102 in FIG. 3 for carrying respectively a LOAD signal, a FIFO write enable signal WRFIFO and an end of frame status EOF STATUS signal. Before the initiation of the transmission process, the microprocessor 12 or the DMA 16 will write an initial number through data bus 34 into a storage device 82' such as a register in down counter 82. The loading of such number into counter 82 is enabled by LOAD signal occurring at time t10 in FIG. 4. A first byte of data is then provided on data bus 34 and is written into transmit FIFO 74 when the write enable signal WRFIFO signal is provided to the FIFO at time t11.

In one conventional transmitter scheme, the transmitter FIFO informs the transmitter of the availability of data for transmission through a line connecting the FIFO and the transmitter and triggers the transmission process. As opposed to such conventional scheme, transmitter 72 is not triggered by the FIFO 74 to transmit the first byte of data when the first byte of data has been written into the FIFO 74. Instead, transmitter 72 continues to transmit a flag signal 92 after a first byte of data is written. In fact, transmitter 72 will continue to transmit flag signals such as 94 until it receives a trigger signal provided by control circuit 80. The write enable signal WRFIFO is also provided to down counter 82, causing the counter to count down by one from the initial value loaded into the storage device through data bus 34 as enabled by the LOAD signal as described above. Therefore, when a write enable signal enables a byte of data to be written into the FIFO 74 through bus 34, the down counter 82 would count down by one. The output count of counter 82 is provided to a detector 84 for detecting a particular count. In the preferred embodiment, detector 84 detects an all zero count of counter 82. Zero detector 84 may simply be a multiple input AND-gate, each of whose inputs is connected to 1 bit of the output count of counter 82. Obviously, by inverting one or more of the bits of the output of counter 82 before applying the inverted and non-inverted bits to an AND-gate, detector 84 may detect any count desired. In the preferred embodiment, when an all-zero count is detected by detector 84, detector 84 generates a trigger signal to trigger data transmission by transmitter 72. If detector 84 is an AND-gate, the gate will provide a signal transition from logic low to logic high for triggering transmitter 72.

It will be noted from FIG. 3 that, instead of the FIFO signalling to the transmitter it has data available for transmission to thereby trigger the transmitter, transmitter 72 instead is triggered by a trigger signal from control circuit 80. In this manner, the tight timing relationship between successive write enable signals (t0–t2 less than time required to transmit a byte of data) inherent in the conventional design is relaxed as shown in FIG. 4. Since transmitter 72 does not begin to transmit data from the transmit FIFO 74 until it receives a trigger signal from control circuit 80, there is no limit in terms of time between successive write enable signals WRFIFO. This is illustrated, for example, in the long time period between times t11 and t12 between the first and second write signals WRFIFO. Indeed it will be observed that transmitter 72 can continue to transmit flag signals long after time t11 or t12. In this manner, control of the data bus 34 may be preempted by the receiver 60 without corrupting the data transmission process. When counter 82 counts down to zero, detector 84 would then provide a trigger signal along line 85 to transmitter 72, causing a first byte of data 96 to be transmitted as indicated in FIG. 4. By such time, an adequate number of bytes of data have been written into FIFO 74, so that there is little danger of transmitter underruns.

The number loaded by the microprocessor or DMA through bus 34 into counter 82 would normally be a number that is less than the number of bytes in the frame. In such event, the above-described operation will function to trigger transmitter 72 before the entire frame has been written into the transmit FIFO 74. Where the number written into counter 82 happens to be more than the number of bytes present in the frame, the transmitter and control circuit 70 of FIG. 3 will still enable data to be transmitted without having to wait until the down counter 82 counts to zero. This is accomplished by AND-gate 86 and OR-gate 88 in control circuit 80 as described below.

When the last byte in a frame is provided to data bus 34, the microprocessor 12 or DMA's 16 will cause the end of frame status line 102 to go from logic low to logic high or "1" logic state. Therefore, when the write enable signal WRFIFO is also raised to logic high by the microprocessor or DMA, the output of gate 86 will rise from logic low to logic high, and this rising edge will pass through OR-gate 88 to trigger transmitter 72 through line 85. Therefore, even though the down counter 82 still has not counted to zero, so that detector 84 will not provide a trigger signal, the above-described transitions of the write enable signal and the end of frame status signal on line 102 will still cause a trigger signal to be generated on line 85 to trigger the transmitter 72 to begin transmission of data from FIFO 74.

As will be evident from the description above, the number stored in storage 82' in counter 82 can be altered in response to the signal provided through data bus 34 and the external LOAD signal. Control circuit 80 monitors the end of frame signal from line 102 and causes a trigger signal to be generated on line 85 even though the quantity of data in FIFO 74 has not exceeded the predetermined level indicated by the initial number stored in storage 82'. The end of frame status provided on line 102 is stored in transmit FIFO 74. Upon detection of the end of frame status bit being high, transmitter 72 then performs error checking such as the cyclic redundancy check and transmits the result of such check along with the last byte of data.

While gates 86 and 88 are shown as AND- and OR-gates respectively, it will be understood that other logic elements may be used instead and are within the scope of the invention.

While detector 84 in the preferred embodiment detects an all-zero count in counter 82, more generally, detector 84 provides an output indicative of a particular count of the counter and logic element 88 responds to the output of the detector and of circuit 86 to generate a trigger signal to the transmitter, to cause the transmitter to begin to transmit data in the memory 74 when the detector detects a particular count of the counter or upon receipt of the end of frame signal by circuit 86.

The method of this invention operates as follows. The method includes monitoring the quantity of data in the FIFO 74 (or more generally any transmit memory) and causing the transmitter to transmit data from the FIFO or memory when quantity of data in the FIFO or memory exceeds a predetermined level. In the preferred embodiment, the quantity of data in the FIFO is monitored by storing a predetermined initial number in counter 82 and decrementing the number each time a byte of data is written into the memory. A trigger signal is then generated when the counter counts down to zero. In addition, the method of this invention includes detecting receipt of an end of frame signal by the memory on line 102 and causing the transmitter to begin transmitting data from the memory upon receipt of the end of frame signal by the memory even though the quantity of data in the memory does not exceed the predetermined level indicated by the number stored in counter 82.

The invention has been described by reference to particular embodiments. It will be understood that various changes and modifications may be made without departing from the scope of the invention which is to be limited only by the appended claims.

What is claimed:

1. An apparatus for transmitting data, comprising:

a transmit first-in, first-out buffer system including a memory that is adapted to receive data in parallel over a bus and a transmitter serially transmitting data out a single line from the memory; and a monitoring device causing the transmitter to begin serially transmitting data from the memory when quantity of data in the memory exceeds a predetermined level so that data underruns are avoided near the start-up of data transmission if the placing of data into the memory over the bus is interrupted before the predetermined level of data is placed in the memory.

2. The apparatus of claim 1, said memory receiving frames of data from a data bus, wherein each frame of data is stored into the memory in response to a strobe signal, said monitoring device including a counter that changes count in response to said strobe signal.

3. The apparatus of claim 2, said monitoring device further including a detector causing the transmitter to begin transmitting data in the memory when the detector detects a particular count of the counter.

4. The apparatus of claim 3, wherein the particular count is zero, and the detector is a logic element.

5. The apparatus of claim 2, wherein said counter is a down counter, said counter including a storage for storing an initial number for the counter.

6. The apparatus of claim 5, said storage in the counter being such that said initial number stored is alterable in response to an external load signal.

7. The apparatus of claim 1, said memory receiving frames of data from a data bus, said monitoring device including a circuit providing an output to cause said transmitter to begin transmitting data from said memory in response to an end of frame signal even though quantity of data in the memory does not exceed said predetermined level.

8. The apparatus of claim 7, said circuit including a first logic element responsive to said end of frame signal.

9. The apparatus of claim 8, wherein each frame of data is stored into the memory in response to a strobe signal, said first logic element responsive to said strobe and end of frame signals, and said element being an AND-gate.

10. The apparatus of claim 7, wherein each frame of data is stored into the memory in response to a strobe signal, said monitoring device including a counter that changes count in response to said strobe signal.

11. The apparatus of claim 10, said monitoring device further including a detector that provides an output indicative of a particular count of the counter, and a second logic element responsive to the outputs of the detector and of the circuit to cause the transmitter to begin transmitting data in the memory when the detector detects said particular count of the counter or upon receipt of the end of frame signal by the circuit.

12. The apparatus of claim 1, wherein the memory stores data in bytes and wherein the monitoring device causes the transmitter to begin transmitting data from the first-in, first-out memory when number of bytes in the memory to be transmitted exceeds a predetermined number of bytes.

13. A method for transmitting data, employing a transmit first-in, first-out buffer system including a memory that is adapted to receive data in parallel over a bus for storing data, and a transmitter serially transmitting data out a single line from the memory; said method comprising:

monitoring quantity of data in the memory; and causing the transmitter to begin serially transmitting data from the memory when quantity of data in the memory exceeds a predetermined level so that data underruns are avoided near the start-up of data transmission if the placing of data into the memory over the bus is interrupted before the predetermined level of data is placed in the memory.

14. The method of claim 13, further comprising:

detecting receipt of an end of frame signal by the memory; and causing the transmitter to begin transmitting data from the memory upon receipt of an end of frame signal by the memory even though quantity of data in the memory does not exceed the predetermined level.

15. The method of claim 13, wherein the memory stores data in bytes, wherein the monitoring step is such that the number of bytes loaded into the first-in, first-out memory is monitored and wherein the causing step is such that the transmitter begins transmitting data from the memory when number of bytes loaded in the first-in, first-out memory to be transmitted exceeds a predetermined number of bytes.

* * * * *